(12) United States Patent
Kalhous et al.

(10) Patent No.: US 9,424,451 B2
(45) Date of Patent: Aug. 23, 2016

(54) LOW-ENERGY RADIO FREQUENCY TAG FOR PERFORMING A VEHICLE FUNCTION

(71) Applicant: GM Global Technology Operations LLC, Detroit, MI (US)

(72) Inventors: Amanda J. Kalhous, Ajax (CA); Norman J. Weigert, Whitby (CA)

(73) Assignee: GM Global Technology Operations LLC, Detroit, MI (US)

( * ) Notice: Subject to any disclaimer, the term of this patent is extended or adjusted under 35 U.S.C. 154(b) by 2 days.

(21) Appl. No.: 14/518,806

(22) Filed: Oct. 20, 2014

(65) Prior Publication Data

US 2016/0110572 A1    Apr. 21, 2016

(51) Int. Cl.
*G06K 7/10* (2006.01)
*H04W 4/00* (2009.01)

(52) U.S. Cl.
CPC .......... *G06K 7/10366* (2013.01); *H04W 4/008* (2013.01)

(58) Field of Classification Search
CPC ........... G06K 7/0008; G06K 19/0723; G06K 7/10009; G06K 7/10366; G06K 7/10316; G06K 19/07749
USPC ........................................................ 340/10.1
See application file for complete search history.

(56) References Cited

U.S. PATENT DOCUMENTS

| | | | |
|---|---|---|---|
| 8,826,008 B2* | 9/2014 | Brown | H04L 63/0823 713/156 |
| 9,002,536 B2* | 4/2015 | Hatton | B60R 25/24 340/426.13 |
| 2013/0309977 A1* | 11/2013 | Heines | G06F 8/70 455/67.7 |
| 2014/0062699 A1* | 3/2014 | Heine | G06K 7/10009 340/572.1 |
| 2015/0257006 A1* | 9/2015 | Mashhadi | H04W 12/08 455/41.2 |

* cited by examiner

*Primary Examiner* — Mark Blouin
(74) *Attorney, Agent, or Firm* — Christopher DeVries; Reising Ethington P.C.

(57) ABSTRACT

A low-energy transceiver tag is described, as well as methods of using the low-energy transceiver tag to enable secure communication with a vehicle. The low-energy transceiver tag includes a substrate, and electronic circuitry carried by the substrate having a transceiver circuit coupled to a power circuit. The transceiver circuit may be configured to transmit a preconfigured answer signal in response to receiving a query signal. In addition, the preconfigured answer signal may be a low-energy response associated with a remotely-located trust anchor.

20 Claims, 4 Drawing Sheets

*Figure 1*
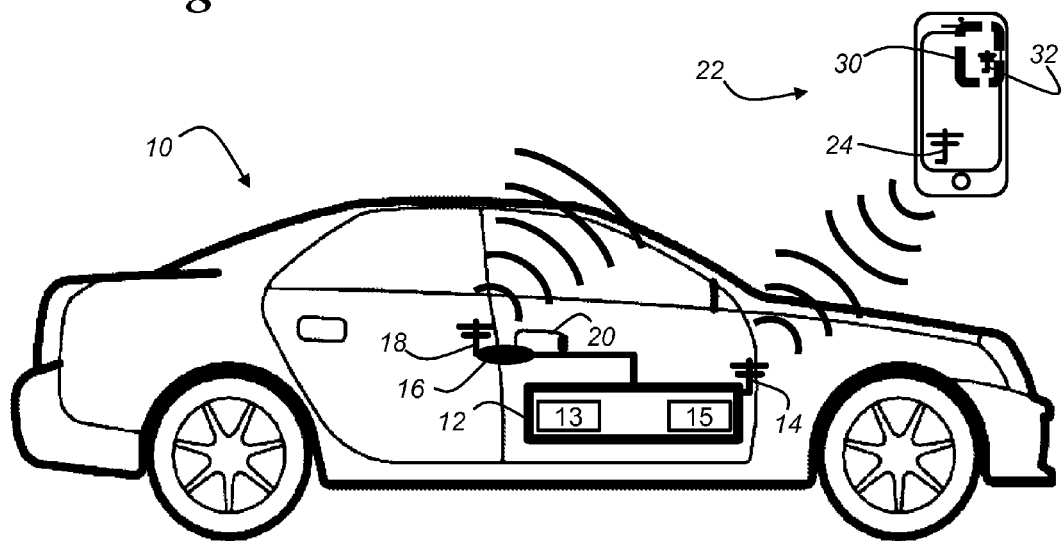
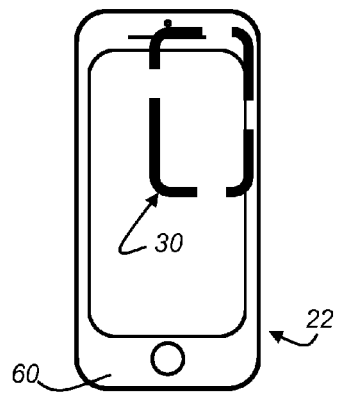
*Figure 3A*
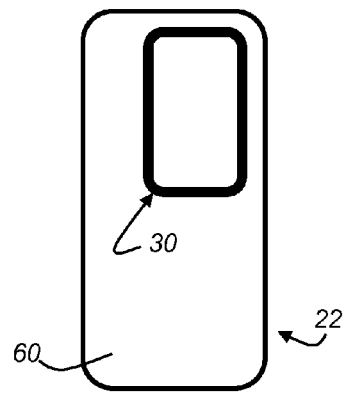
*Figure 3B*
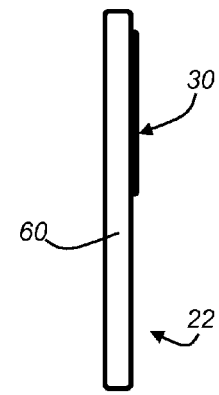
*Figure 3C*

LOW-ENERGY RADIO FREQUENCY TAG FOR PERFORMING A VEHICLE FUNCTION

TECHNICAL FIELD

The present invention relates to controlling vehicle functions wirelessly using low-energy radio frequency tags.

BACKGROUND

Using smart phones together with smart vehicles, short range wireless protocols may enable remote performance of various vehicle tasks. For example, using his or her smart phone, a vehicle driver may unlock his/her vehicle door from the office, from within a shopping mall or from another relatively distant location. Similarly, the same smart phone may command the vehicle to be remotely started. Such approaches use software installed on the smart phone that connects with backend telematics services and provides message data to the backend indicating the driver's desired task. In response to receiving this message data, the backend sends a control signal to the vehicle over a cellular communication network to perform the task.

SUMMARY

According to an embodiment of the invention, there is provided a low-energy transceiver tag that includes a substrate and electronic circuitry carried by the substrate having a transceiver circuit coupled to a power circuit. The transceiver circuit may be configured to transmit a preconfigured answer signal in response to receiving a query signal. In addition, the preconfigured answer signal may be a low-energy response associated with a remotely-located trust anchor.

According to another embodiment of the invention, there is provided a method of secure communication between a vehicle and a mobile device. The method may include the steps of: initiating short range wireless communication (SRWC) between a vehicle and a mobile device; determining whether the mobile device is authorized to command vehicle functions, wherein the determining step includes: sending the mobile device a challenge query; receiving a challenge response to the challenge query from the mobile device, wherein the mobile device acquires the challenge response from a radio frequency (RF) tag and then gates the challenge response to the vehicle via SRWC; attempting to validate the challenge response at the vehicle; and if the challenge response is validated at the vehicle, performing a vehicle function based on the validation.

According to another embodiment of the invention, there is provided a method of providing a challenge response from a radio frequency (RF) tag to a mobile device. The method includes the steps of: scavenging RF power from the proximately-located mobile device; storing the scavenged power in a storage device of the RF tag; receiving a wireless prompt at the RF tag from one of: the mobile device or a vehicle transceiver, wherein if the wireless prompt is received from the mobile device, it occurs after: the mobile device and a vehicle have initiated short range wireless communication (SRWC), and the vehicle has sent the mobile device a challenge query to authenticate the mobile device; and wherein if the wireless prompt is received from the vehicle transceiver it occurs after the RF tag is positioned within a near-field range of the vehicle transceiver; in response to the wireless prompt, transmitting a challenge answer using the power stored in the storage device.

BRIEF DESCRIPTION OF THE DRAWINGS

One or more embodiments of the invention will hereinafter be described in conjunction with the appended drawings, wherein like designations denote like elements, and wherein:

FIG. 1 is a schematic diagram of an operating environment depicting a vehicle and a mobile device having a radio frequency (RF) tag;

FIGS. 3A-3C illustrate different views of the mobile device shown FIG. 1;

DETAILED DESCRIPTION OF THE ILLUSTRATED EMBODIMENT(S)

Figure 2A:
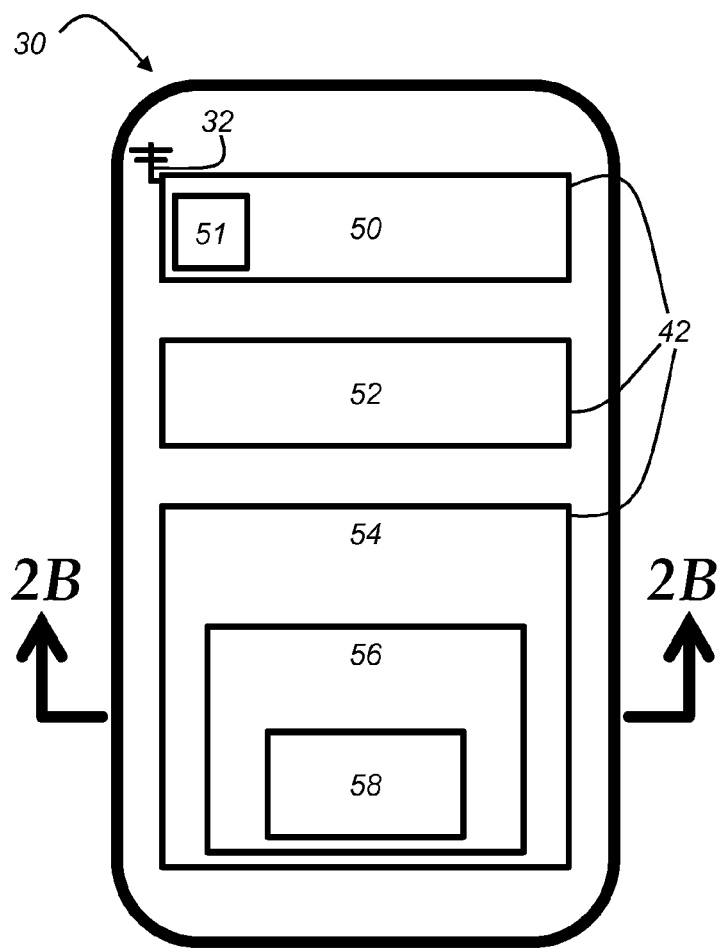
FIG. 2A illustrates a schematic view of the RF tag of FIG. 1.

A radio frequency (RF) tag and method(s) of using the tag are described below. The RF tag enables a user of a mobile device to automatically perform a function at a vehicle that is also associated with both the user and/or mobile device. The RF tag may be fixed on or near the mobile device and may have very-short range communication capability (e.g., near-field range or even less). Communication between the mobile device and the RF tag may include providing the mobile device with information authenticatible by the vehicle. And the mobile device, when in short-range wireless communication (SRWC) with the vehicle, may request and acquire the authenticating information from the RF tag and thereafter serve as a wireless gateway providing the acquired information to the vehicle. Thus, instead of the vehicle user needing to provide input to the mobile device to perform a desired vehicle function, this may be performed automatically whenever the mobile device comes into proximity of the vehicle. One example of such a function might be unlocking the vehicle door(s). In addition, the RF tag may have the capability of scavenging RF energy from the mobile device in order to power its circuitry and the occasional transmission of authenticating information at the mobile device's request.

With reference to FIG. 1, there is shown an operating environment that comprises a vehicle 10 and a mobile device 22 that can be used to implement the method disclosed herein. The vehicle is shown having an embedded wireless transceiver 12 (e.g., a vehicle telematics unit or VTU having memory 13, a processor 15, and an antenna 14—the processor 15 suitably configured to carry out the method(s) described herein. The transceiver 12 may be an electronic device suitably adapted for short-range wireless communication (SRWC). SRWC is intended to be construed broadly and may include one or more suitable wireless protocols including: any Wi-Fi standard (e.g., IEEE 802.11); Wi-Fi Direct, Bluetooth, Bluetooth Low-Energy (BLE), Digital Living Network Alliance (DLNA), or other suitable peer-to-peer standard; wireless infrared transmission; WiMAX; ZigBee™; and/or various combinations thereof. This list is merely meant to provide examples and is not intended to be limiting. In some implementations, the transceiver 12 also may be capable of long range or cellular communication (e.g., including GSM, CDMA, LTE, etc.).

In at least one embodiment, the vehicle 10 also may include a backup transceiver 16 having an associated antenna 18. The backup transceiver 16 may be located in any suitable location on the vehicle 10 that is wirelessly accessible from the exterior of the vehicle. In one example, the transceiver 16 is positioned near a door handle 20.

FIG. 1 also schematically illustrates that the mobile device 22 also may comprise a SRWC antenna 24 for communicating with both the vehicle 10 and a radio frequency (RF) or low-energy transceiver tag 30 (which may also have an associated antenna 32).

While not illustrated, it should be understood that the mobile device 22 may further include any suitable hardware, software, and/or firmware enabling cellular telecommunications (as well as SRWC communication). The hardware of the mobile device may comprise: a processor and memory (e.g., non-transitory computer readable medium configured to operate with the processor) for storing the software, firmware, etc. The mobile device processor and memory may enable various software applications, which may be preinstalled or installed by the user (or manufacturer) (e.g., having a software application or graphical user interface or GUI). One commercial implementation of a vehicle-mobile device application may be RemoteLink™, enabling a vehicle user to communicate with the vehicle 10 and/or control various aspects or functions of the vehicle—e.g., among other things, allowing the user to remotely lock/unlock vehicle doors, turn the vehicle On/Off, check the vehicle tire pressures, fuel level, oil life, etc.

The mobile device hardware also may include a display, a keypad (e.g., push button and/or touch screen), a microphone, one or more speakers, motion-detection sensors (such as accelerometers, gyroscopes, etc.), and a camera.

In addition to the aforementioned features, modern mobile devices may support additional services and/or functionality such as short messaging service (SMS or texts), multimedia messaging service (MMS), email, internet access, as well as business and gaming applications.

Non-limiting examples of the mobile device 22 include a cellular telephone, a personal digital assistant (PDA), a smart phone, a personal laptop computer or tablet computer having two-way communication capabilities, a netbook computer, a notebook computer, or any suitable combinations thereof. The mobile device 22 may be used inside or outside of the vehicle 10, and may be coupled to the vehicle by wire or wirelessly (e.g., using short range wireless communication). The mobile device also may be configured to provide services according to a subscription agreement with a third-party facility or wireless/telephone service provider. It should be appreciated that various service providers may utilize the wireless carrier system and that the service provider of the telematics unit 12 may not necessarily be the same as the service provider of the mobile devices 22.

Figure 2B:
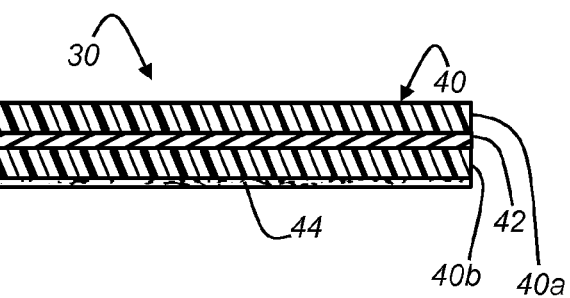
FIG. 2B illustrates a cross-sectional view of the RF tag along section lines 2B-2B of FIG. 2A.

The RF tag 30 is illustrated also in FIGS. 2A and 2B. FIG. 2A illustrates a schematic view of the RF tag 30, and FIG. 2B illustrates a cross-sectional view of the tag along lines 2B-2B of FIG. 2A showing one embodiment of the RF tag layers. A substrate or substrate layer 40 is shown that surrounds or envelopes an electronic circuit(ry) or electronic circuitry layer 42. FIG. 2B illustrates substrate material 40a, 40b on either side of the electronic circuitry 42; however, this is merely an example. For instance, electronic circuitry may be carried by or partially embedded in the substrate 40 if desirable. In addition, a fastening layer 44 is shown on one side of the substrate 40. The fastening layer 44 may be any suitable means for fastening the RF tag 30 to another structure, such as an exterior surface 60 of the mobile device 22 (see FIG. 3B). Nonlimiting examples of the fastening layers include: an adhesive, Velcro™, a sleeve or pocket, a clip or fastener, etc.

FIG. 2A illustrates that in one embodiment, the electronic circuitry 42 may include a transceiver circuit 50 (coupled to the antenna 32), memory or a memory device 52, and a power circuit 54 that includes a charging circuit 56 that is coupled to a storage device 58. Although the circuits/device are shown schematically, it will be appreciated that the circuits/device may be interconnected to one another in any suitable arrangement.

The transceiver circuit 50 may include any communication device capable of receiving a wireless prompt or query and then transmitting a wireless reply or answer. In at least some embodiments, the circuit 50 is suitably adapted for short-range wireless communication (SRWC). Suitable SRWC protocols should be construed broadly and include any or all of those described above with respect to the vehicle transceiver 14. In addition, the transceiver circuit 50 may be capable of any suitable very-short range wireless communication (e.g., such as near-field communication or NFC). The transceiver circuit 50 may include a processor 51 configured to carry out wireless receiving, wireless transmitting, and any interaction between the circuits 50 and 54 and memory 52.

The memory device 52 may be any suitable memory device including, but not limited to, RAM or random access memory, ROM or read-only memory, EPROM or erasable programmable ROM, EEPROM or electrically erasable programmable ROM, flash memory, or any other suitable type of data storage device.

The power circuit 54 may be any suitable circuitry for powering the transceiver circuit 50 and memory 52. The charging circuit 56 is configured to scavenge or harvest wireless or other RF energy and convert that wireless energy into a usable form for powering the RF tag 30. Thus, when the RF tag 30 is in close proximity to a RF device such as the mobile device 22, wireless energy scavenged during the mobile device's normal operation may power the RF tag. This scavenged energy may be stored in the storage device 58. One example of the storage device 58 includes a capacitive element; however, other example exist. Thus, in some implementations, the RF tag 30 may be perpetually charged (and re-charged) provided it is in proximity to an RF source (such as the mobile device).

In another embodiment, the storage device 58 may be a battery (or electrochemical cell for converting stored chemical energy into electrical energy)—which may or may not be chargeable. Thus, it will be appreciated that the term storage device intended is to be broadly construed. However, skilled artisans will appreciate that the scavenging power circuit 54 may enable the RF tag 30 to have a very low profile—which may be virtually unnoticeable to a mobile device user, whereas some battery power circuit implementations may be thicker.

FIGS. 3A-3C respectively illustrate a front view of the mobile device 22, a rear view, and a side view—the mobile device carrying the RF tag 30 on the exterior surface 60. In addition, FIG. 3C illustrates the very low profile implementation previously described.

Figure 4A:
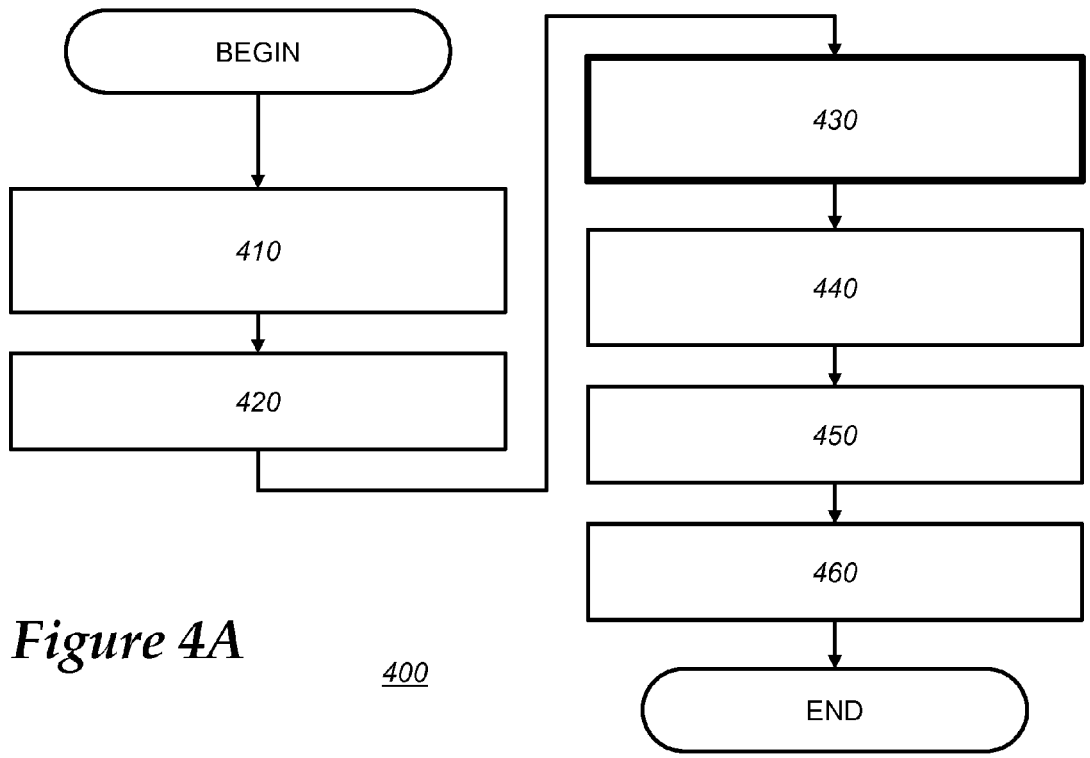
FIGS. 4A-4B illustrate a flow diagram depicting a method of secure communication between the vehicle and the mobile device of FIG. 1 using the RF tag.
Figure 4B:
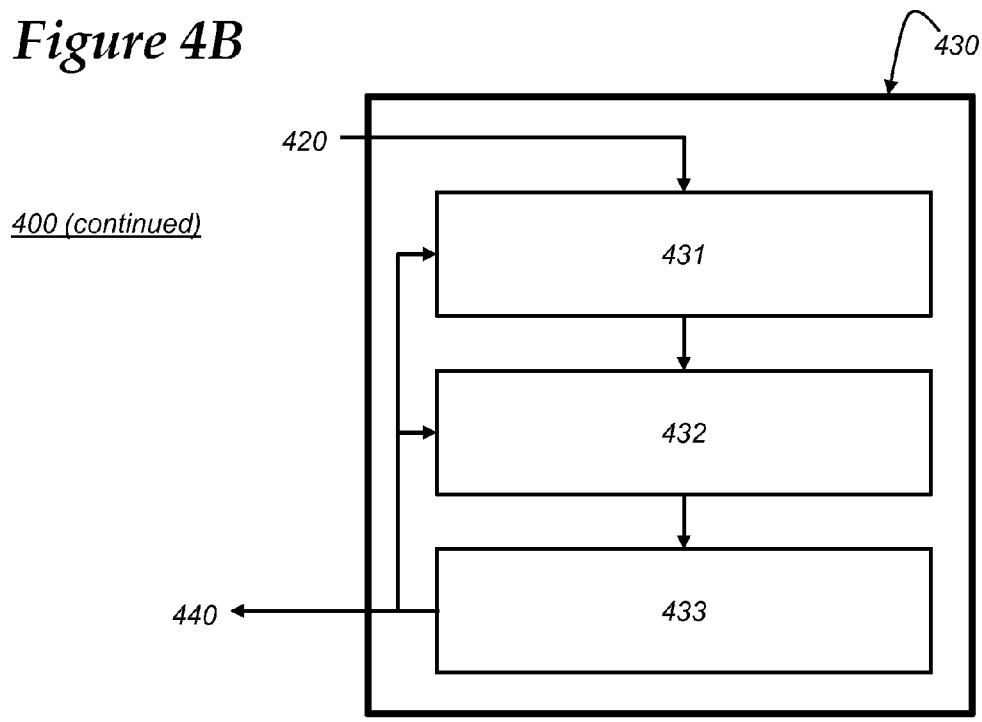

Now turning to one embodiment of using the RF tag 30, FIGS. 4A and 4B collectively illustrate a method 400 of using the vehicle 10, the mobile device 22, and the RF tag 30 to carry out a vehicle function. The method 400 is illustrated using a Bluetooth Low-Energy protocol (BLE); however, this is merely an example; other SRWC protocols are also possible. The method 400 begins with step 410.

In step 410, a short-range wireless vehicle-to-mobile device communication is initiated. This may occur in a variety of ways. For example, using the BLE protocol, the mobile device may transmit a wake-up signal to the vehicle transceiver 12 which in turn may wake up and respond. The vehicle and mobile device may determine whether the devices are previously paired and, if so, may proceed to step 420. Or for example, the two devices 12, 22 may conduct pairing if necessary.

In step 420, the vehicle transceiver 12 may wirelessly provide a challenge or challenge request to the mobile device 22 via BLE. The challenge request may be associated with a trust anchor stored in the transceiver's memory 13. The trust anchor may include any data that is uniquely decryptable by the vehicle 12; e.g., any data encrypted using a trusted and known certificate held by the vehicle (or associated with a certificate held by the vehicle). For example, the processor 15 may generate the challenge request (and a corresponding expected challenge answer) based, at least in part, on the trust anchor—storing both the request and the answer in memory 13. In one embodiment, the challenge request may be to enable pairing of the devices; in another embodiment, the challenge request may occur following pairing. In either instance, as will be discussed more below, the challenge request may enable the mobile device to control one or more vehicle functions. Thereafter, the method proceeds to step 430.

In step 430, the mobile device 22 may send a wireless signal or wireless prompt to the RF tag 30 to acquire the challenge response or answer. The prompt may be sent via BLE or another protocol (e.g., NFC). In at least one embodiment, the strength of the wireless prompt may be significantly minimized to reduce the likelihood of undesirable eavesdroppers. The degree to which the wireless signal strength is minimalized may, for example, be outside the range of the BLE specification or standard. For example, the relative signal strength or range of the wireless prompt may be a magnitude less than or equal to very-short range or near-field communication (NFC) (e.g., less than or equal to 0.2 meters (m)). And in at least one embodiment, the relative signal strength of the wireless prompt may be less than or equal to 10 centimeters (cm). A portion of step 430 is further illustrated in FIG. 4B.

As shown in FIG. 4B, the RF tag 30 scavenges power from the RF energy of the mobile device 22 in step 431. Scavenging techniques for capturing and converting RF energy into another electrical form are known to skilled artisans. This scavenging may be occurring concurrently or prior to step 430. Regardless, scavenged energy may be stored in the storage device 58.

In step 432 (which follows), the RF tag receives the wireless prompt from the RF tag; and the wireless prompt requests the challenge response that may be stored in memory 52. The challenge response may be based upon a predetermined and unique seed or identifier that may be encrypted. The unique identifier may be any suitable combination of numbers, letters, characters, symbols, etc. that a vehicle manufacturer may use to associate the RF tag 30 with the vehicle 10 (or the transceiver 12 in the vehicle). Moreover, when the unique identifier is encrypted, the encryption-type may be known to the vehicle transceiver 12—as the pairing or matching of the unique identifier and the vehicle 10 may occur at the manufacturer. Step 433 follows.

In step 433, the RF tag 30 provides a burst signal in response to the wireless prompt. The burst signal drains at least some of the energy stored in the storage device 58. In addition, the relative signal strength or range of the burst signal is of a magnitude less than or equal to NFC (e.g., less than or equal to 0.2 meters (m)). And in at least one embodiment, the burst signal may be less than or equal to 10 centimeters (cm). In addition, burst signal may be over an unsecure channel (e.g., also known as a dirty channel). Thus, it should be appreciated that even when the wireless prompt signal was transmitted at a signal strength greater than NFC, the RF tag's response or burst signal may be less than or equal to NFC standards. Thus, at the very least, it is assumed that any undesirable eavesdroppers will not be capable of acquiring the response to the challenge response over the unsecure channel. Following step 433, the method may proceed to step 440 (FIG. 4A).

However, in at least one implementation shown in FIG. 4B, the method may proceed to either step 431 or 432 again. In some scenarios, the mobile device 22 may resend the wireless prompt—e.g., when the burst signal from the RF tag 30 was not received (or was received only in part). Thus, the RF tag may begin charging again (step 431), or it may receive the wireless prompt again (step 432) before re-charging can begin. In at least one embodiment, the RF tag 30 stores sufficient power in the storage device 58 to retransmit the burst signal or the challenge response (step 433) without re-charging the storage device 58 (in step 431); i.e., the method may proceed directly from step 433 to step 432. In fact, in one embodiment, this cycle may occur several or more times before the storage device 58 is entirely drained.

Regardless, presuming in step 430 that the mobile device 22 acquires the challenge response from the RF tag 30, the method proceeds to step 440. In step 440, the mobile device gates or acts as a gateway for providing the challenge response to the vehicle transceiver 12. In at least one embodiment, the mobile device simply transmits the response via the SRWC protocol (e.g., BLE). In another embodiment, the challenge response (e.g., already encrypted) is packaged in an encryption envelope and transmitted (e.g., a second layer of cryptography).

In step 450 which follows, the vehicle transceiver 12 receives the challenge response and validates its authenticity. For example, the transceiver 12 may retrieve from memory 13 an identifier and conduct a hash of that identifier. The challenge response may be authenticated if the challenge response matches the hash of the vehicle transceiver's stored identifier—i.e., the unique identifier in the RF tag 30 was identical to the identifier stored in the transceiver's memory 15 (and the transmitted response—step 440—was not tampered with). Or in another embodiment, the expected challenge answer is stored in memory 13 and provided the expected challenge answer and transmitted challenge response match, then the transceiver 12 validates the transaction.

After step 450, the vehicle 10 may perform a vehicle action or function provided the challenge response was accurate. This may occur in several ways. For example, receipt of the challenge response may queue a predetermined vehicle function—e.g., unlocking the vehicle doors, starting the vehicle, etc. Or the receipt of the correct challenge response may authenticate the mobile device 22 to the vehicle transceiver 12 enabling the device 22 to command the vehicle to perform some action. In at least one embodiment, the entire process is automated; i.e., no user interaction with the mobile device is required by the user in order to perform the vehicle function. For example, in one embodiment, the user (who is carrying his/her mobile device 22) approaches the vehicle. Once within SRWC communication range (e.g., 100 m), the steps 410-460 occur without the user performing any task or providing any input to the mobile device. Hence, by the time the user has reached the vehicle 10, the vehicle (for example) is running, the doors are unlocked, or both. At the very least, the authentication of the mobile device 22 (and thus, presumably the user) is performed without input to the mobile device (e.g., the user was not required to input a password into the mobile device associated with performing vehicle function(s)).

Figure 5:
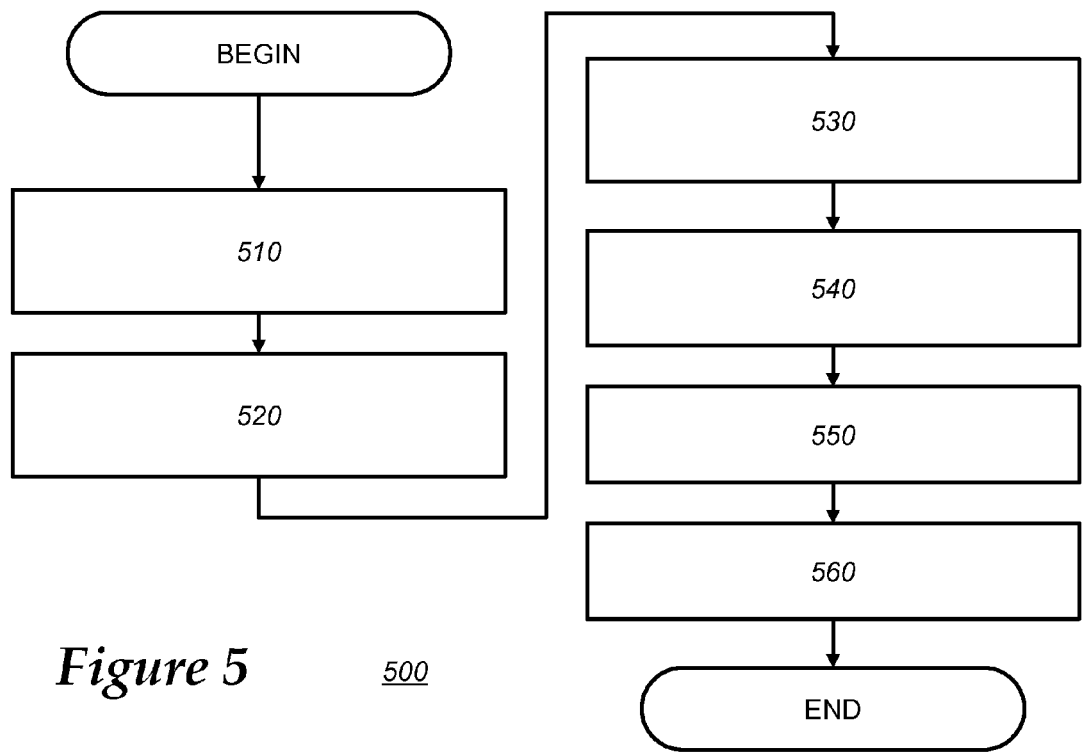
FIG. 5 illustrates a flow diagram depicting a method of secure communication between the vehicle and RF tag of FIG. 1 when the mobile device is inoperable.

The RF tag 30 may facilitate a backup method of performing at least one vehicle function as well. For example, as previously described, the RF tag may scavenge and store RF energy from the mobile device. It will be appreciated that instances may occur when the battery life of the mobile device may fail or be completely drained or the mobile device is not fully operational. The method 400 relies upon communication between the mobile device 22 and the vehicle transceiver 12. However, if for example the mobile device 22 is temporarily inoperable, the RF tag still may be capable of performing the desired vehicle function(s) since the scavenged energy may still be present in the RF tag 30 as shown in FIG. 5 and discussed below.

Method 500 begins with the RF tag 30 scavenging energy from the mobile device 22 while the mobile device is in a powered state (step 510). This step may be similar to step 431 described above.

Thereafter in step 520, the mobile device 22 is powered down or to an unpowered state (e.g., purposely or due to a weakened or dead battery or damaged device).

Next in step 530, the RF tag 30 receives a wireless prompt directly from the wireless backup transceiver 16 (e.g., located in or around the door handle 20; see FIG. 1). The vehicle 10 may be configured to provide such a wireless prompt based upon some user action—e.g., in one instance, when the door handle is lifted by the user, the transceiver 16 transmits the wireless prompt. As discussed with respect to step 432, the wireless prompt of step 530 may have a signal strength less than or equal to a standard NFC signal strength and range—and in some instances the signal strength may be no more than 10 cm of range.

Steps 540, 550, and 560 may be similar to those described above (namely, steps 440, 450, and 460, respectively) with the exception of course that the transmitted response comes from the RF tag in step 540 (rather than the mobile device (as it did in step 440)). Thus, the RF tag 30 may transmit the challenge response upon receiving the wireless prompt; the vehicle may receive and validate the response; and the vehicle may perform a vehicle function.

The method 500 thus provides a backup means for when the mobile device is turned off, drained of its battery power, or is broken or damaged, just to name a few examples.

Figure 6:
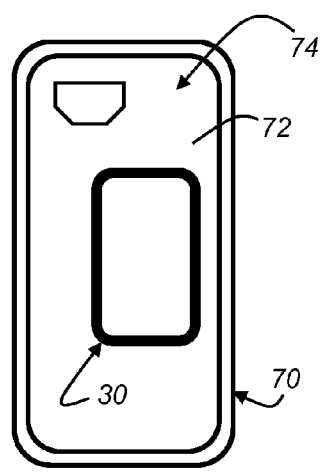
FIG. 6 illustrates an accessory suitable for carrying the RF tag of FIG. 1.

Other implementations also exist. For example, the RF tag 30 may be coupled or attached to something other than the exterior surface 60 of the mobile device 22. FIG. 6 illustrates an accessory 70 (e.g. a cover or case without the mobile device 22 therein). The RF tag 30 is attached to an interior surface 72 of a cavity 74 sized to receive the mobile device 22. This is merely one example; other examples will be apparent to skilled artisans.

In another implementation, the mobile device may transmit the challenge response obtained from the RF tag via cellular communication to the vehicle 10 (more specifically, to the transceiver 12)—and after validation—a vehicle function may be performed.

The vehicle transceiver 12 has been described as a vehicle telematics unit; however, it should be appreciated that this merely one example. The transceiver 12 should be broadly construed to include any number of devices. For example, the transceiver 12 may include a passive entry/passive start (or PEPS) module, a body control module (BCM), or any other control unit embedded or installed within the vehicle 10. Further in instances where the BCM does not have wireless capabilities, the transceiver 12 may include the BCM coupled to and/or with another suitable transceiving device enabling the functionality of the transceiver 12, as described above.

Thus, there has been described an RF tag that may be attached to various devices to store and transmit a challenge response to a mobile device that is located in the vicinity of an associated vehicle. The mobile device may transmit the challenge response to the vehicle for authentication of the user-thereby enabling vehicle access or one or more vehicle functions. In addition, the RF tag may be positioned by a user in close proximity of a vehicle backup transceiver such that the vehicle function(s) may be performed without the use of the mobile device's transmission. The RF tag may be powered by several means; however, in at least one implementation, the RF tag may scavenge RF energy from the mobile device and store the energy for later transmission of the challenge response.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A low-energy transceiver tag adapted to be carried on or near a mobile device, comprising:
   a substrate; and
   electronic circuitry carried by the substrate having a transceiver circuit coupled to and powered by a power circuit,
      wherein the transceiver circuit is configured to transmit a preconfigured wireless answer signal in response to receiving a query signal, wherein the preconfigured wireless answer signal is a low-energy response associated with a trust anchor located in a vehicle, wherein the power circuit is adapted to scavenge and store radio frequency (RF) energy from wireless transmissions of the mobile device.

2. The tag of claim 1, wherein the power circuit includes a charging circuit having a storage device for storing the scavenged RF energy.

3. The tag of claim 2, wherein the storage device is capable of storing energy sufficient to enable the transceiver circuit to transmit the preconfigured wireless answer signal multiple times without re-charging.

4. The tag of claim 1, wherein the substrate and circuitry are sized to be carried on an exterior surface of the mobile device and have a low profile.

5. The tag of claim 4, wherein one side of the substrate comprises a fastening means for coupling the tag to one of the exterior surface of the mobile device or an exterior surface of a mobile device carrying case.

6. The tag of claim 1, wherein the electronic circuitry further comprises memory for storing the preconfigured wireless answer signal, wherein the answer signal is preconfigured by a vehicle manufacturer and uniquely associated with a vehicle.

7. A method of secure communication between a vehicle and a mobile device, comprising the steps of:
    initiating short range wireless communication (SRWC) between a vehicle and a mobile device;
    determining whether the mobile device is authorized to command vehicle functions, wherein the determining step includes:
        from the vehicle, sending the mobile device a challenge query;
        receiving at the vehicle a challenge response to the challenge query from the mobile device, wherein the mobile device acquires the challenge response from a radio frequency (RF) tag and then gates the challenge response to the vehicle via SRWC;
        attempting to validate the challenge response received from the RF tag via the mobile device at the vehicle; and
    when the challenge response is validated at the vehicle, then performing a vehicle function based on the validation.

8. The method of claim 7, wherein the RF tag is either carried by an exterior surface of the mobile device or by an accessory proximate the mobile device.

9. The method of claim 7, wherein the RF tag comprises: a transceiver circuit, a memory device, and a power circuit having a charging circuit that includes a storage device.

10. The method of claim 9, wherein the storage device is one of: a battery, a scavenging circuit for scavenging RF energy from the mobile device, or both.

11. The method of claim 9, wherein the RF tag transmits a burst signal carrying the challenge response after receiving a wireless prompt by the mobile device, wherein a power output associated with the burst signal limits the transmission to a near-field range.

12. The method of claim 11, wherein the near-field range is less than ten centimeters.

13. The method of claim 11, wherein, when the storage device is charged to capacity, the storage device stores sufficient energy to transmit more than one burst signal.

14. The method of claim 11, wherein the burst signal is unsecure.

15. The method of claim 7, wherein the challenge response is associated with a predetermined encrypted seed value.

16. The method of claim 7, wherein the vehicle function includes automatically unlocking a vehicle door when the mobile device is within a range of the vehicle enabling SRWC.

17. A method of providing a challenge response from a radio frequency (RF) tag to a mobile device, comprising the steps of:
    scavenging RF power from the proximately-located mobile device;
    storing the scavenged power in a storage device of the RF tag;
    receiving a wireless prompt at the RF tag from one of: the mobile device or a vehicle transceiver,
        wherein when the wireless prompt is received from the mobile device, it occurs in response to:
            the mobile device and a vehicle initiating short range wireless communication (SRWC), and
            the vehicle sending the mobile device a challenge query to authenticate the mobile device;
        and wherein when the wireless prompt is received from the vehicle transceiver, it occurs in response to the RF tag being positioned within a near-field range of the vehicle transceiver; and
    in response to the wireless prompt, transmitting a challenge answer using the power stored in the storage device.

18. The method of claim 17, wherein the wireless prompt at the RF tag is received from the vehicle via the mobile device, wherein the challenge answer is transmitted using a low RF power to the mobile device so that the mobile device may gate the challenge answer in a SRWC message to the vehicle, wherein the low RF power is less than or equal to a near field range.

19. The method of claim 17, wherein the wireless prompt at the RF tag is received from the vehicle transceiver, wherein the challenge answer is transmitted with a low RF power to the vehicle transceiver, wherein the low RF power is less than or equal to a near field range.

20. The method of claim 7, wherein the gated challenge response received from the mobile device includes one of:
    receiving an unaltered challenge response from the mobile device at the vehicle via SRWC; or
    receiving an encrypted challenge response at the vehicle via SRWC, wherein the mobile device encrypted the challenge response prior to transmitting it via SRWC.

* * * * *